US012763556B2

(12) United States Patent
Lunde et al.

(10) Patent No.: US 12,763,556 B2
(45) Date of Patent: Oct. 13, 2026

(54) CABLE HANDLING BOW FOR AN OVERBOARDING SYSTEM OF A WORK PLATFORM

(71) Applicant: NEXANS, Courbevoie (FR)

(72) Inventors: Johannes Lunde, Bekkestua (NO); Ola Ystgaard, Oslo (NO)

(73) Assignee: NEXANS, Courbevoie (FR)

( * ) Notice: Subject to any disclaimer, the term of this patent is extended or adjusted under 35 U.S.C. 154(b) by 53 days.

(21) Appl. No.: 18/950,680

(22) Filed: Nov. 18, 2024

(65) Prior Publication Data

US 2025/0167529 A1 May 22, 2025

(30) Foreign Application Priority Data

Nov. 17, 2023 (NO) .................................... 20231252

(51) Int. Cl.
*H02G 1/10* (2006.01)
*B63B 27/28* (2006.01)
*B63B 35/04* (2006.01)

(52) U.S. Cl.
CPC ............... *H02G 1/10* (2013.01); *B63B 27/28* (2013.01); *B63B 35/04* (2013.01)

(58) Field of Classification Search
CPC .......... H02G 1/10; B63B 27/28; B63B 27/32; B63B 35/04
See application file for complete search history.

(56) References Cited

FOREIGN PATENT DOCUMENTS

| | | | | | |
|---|---|---|---|---|---|
| CN | 112551254 | A | | 3/2021 | |
| CN | 114156788 | A | | 3/2022 | |
| GB | 2564131 | A | | 1/2019 | |
| JP | S53132692 | U | | 10/1978 | |
| JP | 2018033278 | A | | 3/2018 | |
| NL | 2022670 | B1 | | 9/2020 | |
| WO | WO-2022093037 | A1 | * | 5/2022 | ............... H02G 1/10 |

OTHER PUBLICATIONS

European Search Report for corresponding application 24306881.4; Report dated May 13, 2025, 29 pages.

MBHydraulikk: "Cable Quadrant" https://web.archive.org/web/20180430155404/https://www.mbh.no/kabelsykkel/?lang=en B63B [retrieved on Apr. 16, 2025], 2 pages.

* cited by examiner

*Primary Examiner* — Kyle Armstrong
(74) *Attorney, Agent, or Firm* — CANTOR COLBURN LLP

(57) ABSTRACT

A cable handling bow (2) for an overboarding system of a work platform has a cable retaining structure (4) for retaining a length of a cable, where the cable retaining structure (4) extends along a partially curved path (6). The path (6) has a first end (8) and an opposed second end (10), where the path (6) has a first straight segment (14) located between the first end (8) and the second end (10) and is spaced away from both ends (8, 10), such that a cable joint connecting two ends of a cable is placeable in the first straight segment (14), when the cable length is retained in the cable retaining structure (4).

13 Claims, 9 Drawing Sheets

CABLE HANDLING BOW FOR AN OVERBOARDING SYSTEM OF A WORK PLATFORM

RELATED APPLICATION

This application claims the benefit of priority from Norwegian Patent Application No. 2023 1252, filed on Nov. 17, 2023, the entirety of which is incorporated by reference.

FIELD OF THE INVENTION

The present invention relates to a cable handling bow for an overboarding system of a work platform, to a cable overboarding system, to a work platform for performing a cable operation, as well as to a method for overboarding a cable.

BACKGROUND

It is known to use vessels or boats having cable handling equipment for performing cable operations on subsea cables, such as a repair of a broken cable. A rear side of a vessel may, for example, comprise a pair of chutes arranged in a lateral distance to each other for guiding two cable end sections from subsea onto a deck of the vessel. Suitable installations on the deck allow inspection, preparation and jointing of the cable ends before the repaired cable can be overboarded again.

For supporting a cable during the overboarding process, cable handling bows are often used. A cable handling bow is an arcuate structure which allows a length of a cable to be turned about 180° at an acceptable bending radius. A cable may run from the sea up one of the chutes, is wrapped around the cable handling bow and leaves the deck into the sea via the other one of the chutes. After placement of the cable on the horizontally arranged cable handling bow, the cable handling bow is usually moved towards the chutes, afterwards tilted upwards into a substantially vertical orientation and lifted off the deck to be submerged by a winch.

Cable ends may be jointed using flexible joints or stiff joints. Flexible joints may have roughly the same bending behavior as the remaining parts of the cable, such that flexible joints may be placed on a cable handling bow and follow its curvature. The jointed cable may then be overboarded as described above.

However, stiff joints usually require a more cumbersome overboarding process. When using stiff joints, the cable handling bow may initially be placed in a significant distance to the chutes to provide enough deck space for arranging the stiff joint and directly adjacent cable sections in a straight manner along the deck. This avoids bending moments on the joint and folding or kinking of the cable sections at the ends of the joint. In addition, a part of the cable is wrapped around the cable handling bow. For overboarding the cable, the cable handling bow, and the stiff joint are handled and moved synchronously by a plurality of separate winches or cranes, until both the cable handling bow, and the joint have left the deck.

An object of the invention lies in providing an alternative method or an alternative overboarding equipment that allows to more efficiently and simply overboard cables. In particular, the object of the invention lies in improving the overboarding of subsea cables having a stiff joint.

SUMMARY OF THE INVENTION

The present invention is defined by the appended claims and in the following:

In a first aspect, the invention relates to a cable handling bow for an overboarding system of a work platform, wherein the cable handling bow comprises a cable retaining structure for retaining a length of a cable, wherein the cable retaining structure extends along a partially curved path, which path has a first end and an opposed second end, wherein the path has a first straight segment located between the first end and the second end and being spaced away from both ends, such that a cable joint connecting two ends of a cable is placeable in the first straight segment, when the cable length is retained in the cable retaining structure.

As used herein, the term "overboarding" refers to the operation of transporting a cable from the sea to a work platform and/or to the operation of transporting a cable from a work platform to the sea. Typically, the cable is transferred between the seabed and the work platform. An overboarding system is therefore a system for performing such an overboarding operation.

As used herein, the term "cable operation" is referring to any type of operation performed on a cable, such as subsea cable cutting, cable recovery, cable joining operation for joining two cable sections, overboarding of joint and lay of cable and joint on the seabed, a cable repair operation for repairing a cable, lay of new cable, pull-in operations etc.

The term "curvature" or "radius of curvature" is referring to the shape of the cable retaining structure or another part of the cable handling bow. The term "bending" or "bending radius" refers to the shape of the cable.

The shape of the cable handling bow according to the invention differs from the usually semi-circular shape of common cable handling bows. By its advantageous shape, the cable handling bow according to the invention allows to safely retain a cable with an integrated, substantially stiff joint having a substantially straight extension, without exposing the joint to bending moments and without exceeding an acceptable curvature of the cable. The overboarding process may be accomplished without requiring more than one winch, crane or other device for overboarding the cable. It is not required to place the joint separately from the cable handling bow on the deck, such that a significant reduction of necessary deck space can be achieved.

The cable handling bow may have a substantially two-dimensional framework structure with an arcuate shape. The framework structure is preferably configured to provide a sufficient structural rigidity for the desired cable operation and may comprise a plurality of interconnected frame members. Preferably, a lifting yoke or a similar component is attached to the framework structure to allow connecting the cable handling bow with a wire of a winch or a crane. The lifting yoke may be pivotably connected to the framework structure. Instead of a lifting yoke also components for a wire rigging may be included.

The cable retaining structure is to be understood as a part of the cable handling bow that retains the cable to follow the partially curved path. The cable retaining structure assists in supporting the cable on the bow in particular for preventing it to slip off in a direction transverse to the main extension plane of the bow, in particular when the bow is tilted from a horizontal orientation into an upright orientation.

The cable retaining structure may form a groove, a trough or a channel. It may comprise a pair of guiding edges that parallelly extend along the partially curved path to define a channel-like structure. The guiding edges may comprise continuous strip-shaped or interrupted border elements. The guiding edges are sufficiently spaced apart from each other to allow to lay the cable between them. Also, the cable retaining structure may comprise a plurality of spaced apart curved support surfaces distributed along the partially curved path.

The partially curved path defines the general shape of the arcuate edge of the cable handling bow, along which the cable retaining structure extends. The path extends from a first end to a second end of the bow and may be understood as an imaginary or notional line that defines the spatial extension of the arcuate edge of the cable handling bow. The tangents of the path at the ends of the path may enclose an angle of roughly 180°. Preferably, they enclose an angle of up to 10° or 20° more than that, for example 190°, which facilitates the cable slipping off the cable handling bow at the opposed ends after overboarding.

As mentioned above, a common cable handling bow usually comprises an arcuate edge continuously extending along a strictly semi-circular path. According to the invention, however, the path is merely partially curved and has a straight section, which is referred to as the first straight segment. The first straight segment is arranged in a distance to both the first end and the second end. This leads to a locally flattened path allowing to completely place a length of the cable with an integrated straight joint on the cable handling bow. Preferably, the first straight segment is dimensioned corresponding to the joint to be used.

The individual segments of the path preferably create a continuous line. The tangents at connected ends of consecutive segments may be substantially identical. Hence, the path may be tangentially continuous. The radius of curvature of curved parts of the path correspond to an acceptable bending radius for the cable. The radius of curvature of the curved parts may also exceed the acceptable bending radius, if the available space is sufficient. For example, the acceptable bending radius may be exceeded by up to 5% or 10%.

Consequently, separate devices for simultaneously lifting and moving the cable handling bow and the joint are not required. The cable length having the straight joint can be overboarded in a single operation. In addition, the cable handling bow may be placed near the chutes or another transition area to the sea at the beginning of the overboarding process since a significant space on the deck for placing the joint is not required. Due to the placement of the first straight section it is possible to arrange the cable handling bow even between two chutes of an overboarding system having a comparably small distance of about 10 m. These advantages allow to select and use smaller vessels, boats or platforms for a cable operation and the required time for preparation and conducting the cable operation as well as the associated costs may be reduced.

The cable retaining structure may have a gap that extends along the first straight segment. The cable retaining structure is thus interrupted at the first straight segment to place the cable joint into the gap. Such an interruption allows to integrate a joint with a larger diameter than the directly adjacent cable sections into the cable handling bow. The gap may comprise two opposed gap ends, between which the joint is to be arranged. The extension of the gap may exceed the desired length of the cable joint by up to 5% or 10% to facilitate its placement into the gap. By way of example, the gap may have a length of roughly 5 to 7 m for receiving a stiff joint for subsea high voltage cables.

The gap may be arranged asymmetrically on the cable handling bow. By an asymmetrical placement of the gap, the cable retaining structure has a generally asymmetrical shape. Thus, the first straight segment is eccentrically placed on the cable handling bow. It does not extend parallelly to a connection line of the first end and the second end, but at an angle of more than zero and less than 90° thereto. The angled/asymmetric/eccentric arrangement of the gap allows to place comparably long joints onto the cable handling bow that have a length that may exceed half the width of the cable handling bow.

The distance between the first end and the second end may roughly correspond to the width of the cable handling bow when neglecting the exact design of the cable retaining structure. The distance between the first end and the second end may also roughly correspond to the distance of center lines of two chutes of the overboarding system, in which the cable handling bow is used. The distance of the center lines of the chutes may exemplarily be 10 m or more. The acceptable bending radius for the cable as well as the length of the joint determines the width of the cable handling bow, the required distance between the chutes and, consequently, the size and shape of the vessel, boat or platform, on which the overboarding system is used.

A first run length of the cable retaining structure from the first end to the first straight segment may be smaller than a second run length of the cable retaining structure from the straight segment to the second end. The first straight segment is thus placed further to the first end. The part of the cable that runs from the first end to the joint will have a smaller degree of bending than the part of the cable that runs from the second end to the joint. The extension of the cable handling bow in a transversal direction to a connection line between the first end and the second end may increase with decreasing the first run length. On the other hand, the width of the cable handling bow, i.e. the dimension parallel to said connection line, may increase with increasing the first run length until the joint would be parallel to said connection line. Hence, particularly depending on the available width for the cable handling bow, a suitable first run length and a suitable second run length need to be selected, under consideration of the joint length and the acceptable bending radius for the cable.

The second run length may have at least double the size of the first run length. This may lead to an advantageous shape of the cable handling bow for a variety of different joint lengths and low widths of the cable handling bow.

The path may have a first curved segment arranged between the first end and the first straight segment, and a second curved segment arranged between the first straight segment and the second end. The cable may thus be continuously curved from the first end to the joint and from an opposed end of the joint to the second end. Both curved segments may have the same radius of curvature or they may have different radii of curvature. When designing the curved segments, an acceptable bending radius for the cable that is to be handled needs to be considered to avoid damages to the cable.

The path may have a second straight segment arranged at the second end. Providing one straight segment, i.e., the second straight segment, at one of the ends assists in forming the asymmetrical shape as explained above. If a first curved segment and a second curved segment together enclose the first straight segment, they may both be curved with the same radius of curvature and a resulting distance between the second end and the second curved segment can be bridged by the second straight segment.

The cable handling bow may comprise a supporting apparatus reaching into the gap and configured to support a cable joint. The supporting apparatus assists in holding the joint to reduce the load onto the directly adjacent parts of the cable that result from mass forces of the joint. In addition, excessive bending moments onto the joint are also prevented. Hence, mass force induced loads from the joint can directly be transferred into the structure of the cable handling bow by the supporting apparatus. For an integration of the supporting apparatus into the cable handling bow, an angular beam may be provided, which may be arranged parallelly to the first straight section. The angular beam may be a part of the framework structure of the bow. The supporting apparatus may comprise one or more holders or support surfaces that are attached to or integrated into the angular beam. However, other variants are not excluded, and the supporting apparatus may have a holder or a support surface that is attached to other parts of the of the bow that are not parallel to the first straight section.

The supporting apparatus may comprise a plurality of curved support surfaces distributed along the gap. This is particularly useful for joints having a rounded or circular cross-section. The curved support surfaces may have a curvature that substantially matches the curvature of an outer surface of the joint. The curved support surfaces may be configured to snap into a releasable engagement with the joint when placing the joint onto the curved support surfaces. The supporting apparatus may then preferably be configured to release the joint after overboarding the cable. However, the curved support surfaces may be configured to receive the joint by placing the joint loosely onto the curved support surfaces, such that the cable remains in place through the action of the cable weight. For example, the curved support surfaces may be fingers or curved, strip-shaped holders that follow an arc of a circle and may form a semi-circle or less.

The cable handling bow may comprise a traverse extending from a region adjacent to the first end of the path to a region adjacent to the second end of the path, wherein the traverse and the first straight section may enclose an angle in the range of 20° to 45°. The traverse may preferably extend parallelly to a connection line between the first end and the second end. It may be a part of the framework structure that forms the cable handling bow, as explained further above. When the cable handling bow is installed on a vessel, the traversal may be arranged substantially parallel to a lateral axis of the vessel. By providing an angle in the range of 20 to 45°, the first straight segment is clearly eccentrically arranged on the arcuated edge of the cable handling bow, while allowing to provide a sufficient space for comparably large cable joints.

The cable retaining structure may comprise a trough. The trough may be dimensioned in accordance to the diameter of the cable. It may be based on a profile that widens in an outward direction to receive and self-center a cable on the cable handling bow. It may have a round profile, a rounded profile, an angular profile or a profile having a flat base and two oblique walls that widen outwards, i.e. in a direction away from the base. Other variants are not excluded. The trough may be designed to provide a funnelling and self-centering function to simplify placement of the cable in the trough.

In a second aspect, the invention relates to a cable overboarding system for a work platform arrangeable on a vessel, comprising a lowering device having a wire, and a cable handling bow according to any of the preceding claims connected to the wire, wherein the wire is connected to the cable handling bow to lower the cable handling bow into the sea. In an embodiment, the cable overboarding system may comprise a winch having a winch wire, a cable handling bow according to the above and connected to the winch wire, a tilting device comprising a base frame and a bow supporting frame, which bow supporting frame being pivotably connected to the base frame, wherein the cable handling bow supporting frame comprises a sheave, and wherein the winch wire connected to the cable handling bow is configured to be guided between the cable handling bow and the winch via the sheave.

In a third aspect, the invention relates to a work platform for performing a cable operation on a cable on a vessel having a vessel deck, wherein the work platform comprises chutes for guiding the cable from the sea and onto the work platform, and an overboarding system according to the above, wherein the base frame and/or the bow supporting frame are at least partially arranged between the chutes.

The work platform may comprise a number of modules, wherein at least some of the modules comprise a deck section and a support structure for supporting the deck section at a distance above the vessel deck, wherein each module is configured to be lifted separately onto and away from the vessel deck, wherein the deck sections of the modules together form a mezzanine deck on which the cable operation is performed, wherein the overboarding system is secured to the mezzanine deck, and wherein at least some of the equipment for performing the cable operation is stored below the mezzanine deck.

In a fourth aspect, the invention relates to a method for overboarding a cable, comprising the steps of providing a cable handling bow according to the above on a deck in a substantially horizontal position, placing a cable length having a joint onto the cable handling bow, such that the joint is arranged in the first straight segment, tilting the cable handling bow into an upright position, and lifting and overboarding the cable handling bow from the deck.

SHORT DESCRIPTION OF THE DRAWINGS

In the following description this invention will be further explained by way of exemplary embodiments shown in the drawings.

FIGS. 6*a* to 6*i* show a sequence of overboarding a cable in top views (FIGS. 6*a* to 6*e*) and perspective views (FIGS. 6*f* to 6*i*).

Figure 7A:
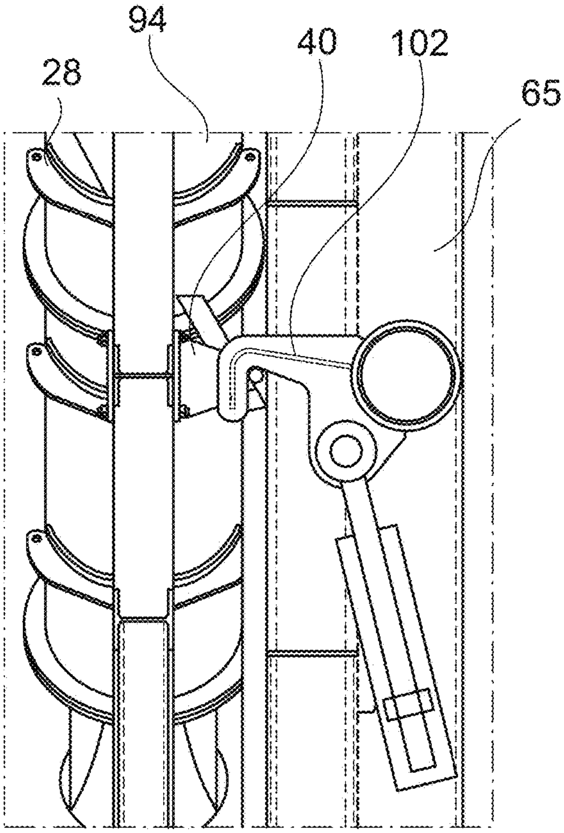

FIG. 7*a* shows a hook securing the cable handling bow to the bow supporting frame.

Figure 7B:
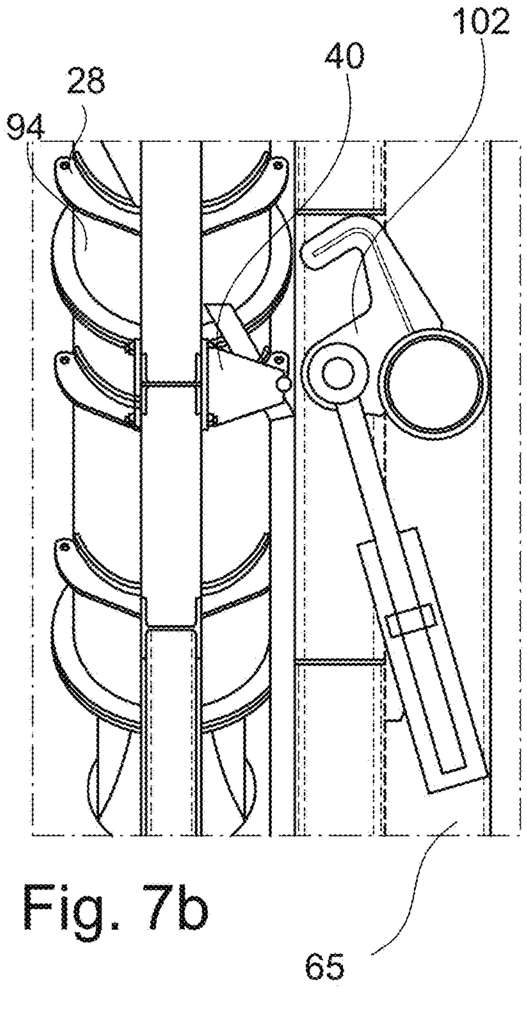

FIG. 7*b* shows the hook of FIG. 7*b* in a released state to release the cable handling bow.

DETAILED DESCRIPTION OF THE INVENTION

Figure 1:
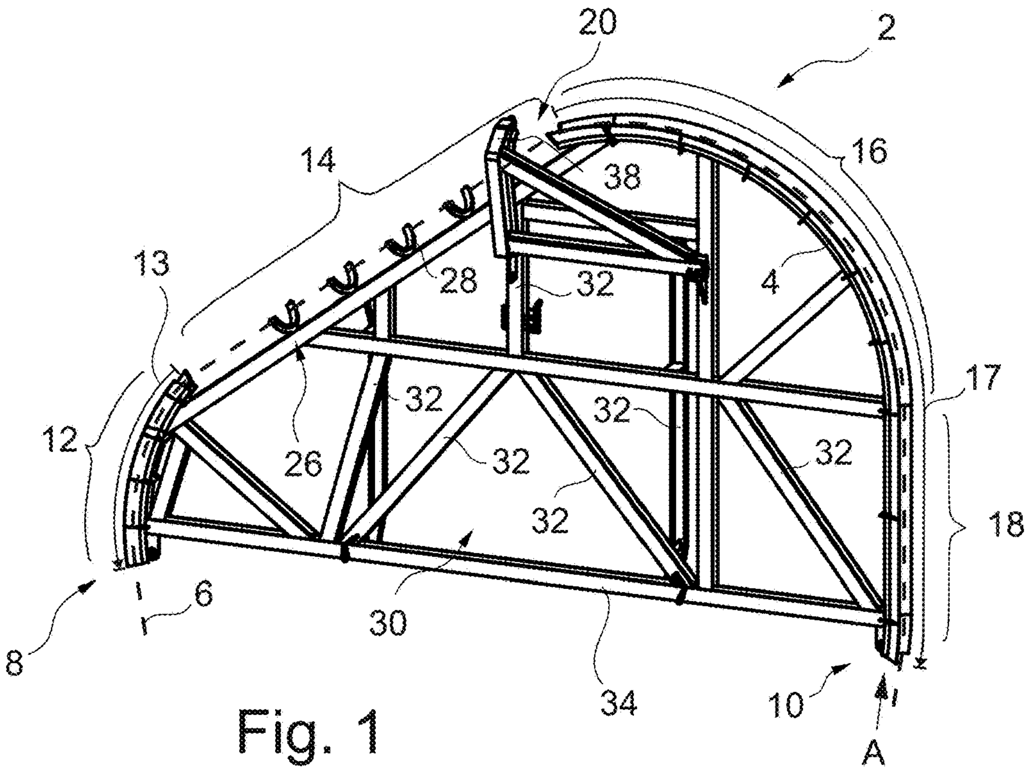
FIG. 1 shows a cable handling bow in a first perspective view.

FIG. 1 shows a cable handling bow 2 for an overboarding system of a work platform. The work platform will be described in more detail further below.

The cable handling bow 2 has a cable retaining structure 4 that extends along a partially curved path 6 from a first end 8 to a second end 10. The path 6 may be considered an imaginary or notional line that defines the general arcuate shape of the cable handling bow 2.

The path 6 has an arcuate or arch shape with a first curved segment 12, a first straight segment 14, a second curved segment 16 and a second straight segment 18. The first curved segment 12 and the second curved segment 16 enclose a gap 20, wherein the gap 20 extends along the first straight segment 14. The second straight segment 18 is arranged between the second end 10 and the second curved segment 16. The curved segments 12 and 16 have substantially the same radius of curvature, which may correspond to the acceptable bending radius for the cable to be handled, or may be slightly above. A run length 13 from the first end 8 to the first straight segment 14 is smaller than a run length 17 from the first straight segment 16 to the second end 10. The general shape of the cable handling bow 2 may be summarized as a partially flattened, asymmetrically skewed semi-circle.

The cable retaining structure 4 is formed as a trough, an exemplary cross-section of which is shown in detail A. The profile of the cable retaining structure 4 may, for example, comprise a planar base surface 22, from which two spaced apart sidewalls 24 extend transverse thereto and define an intermediate space that widens outwardly with increasing distance to the base surface 22. Thus, the profile may lead to a funneling and self-centering function to hold the cable in the cable retaining structure 4.

The first straight segment 14 and the gap 20 allow to receive an elongated, stiff cable joint on the cable handling bow 2. Such a cable joint may be formed by a metallic and/or plastic material and has a clearly lower flexibility than the cable and cannot be bent with the same bending radius as the cable without becoming plastically deformed. Hence, to avoid plastic deformation or a break, such a cable joint would need to be placed along a straight line. The cable handling bow 2 allows the cable joint to be integrated into the gap 20 and/or the first straight segment 14, respectively. Cable portions that are directly adjacent to the cable joint rest on the curved segments 12 and 16 and form a smooth transition between the cable and the joint.

For supporting the joint on the cable handling bow 2, a supporting apparatus 26 is provided, which exemplarily reaches into the gap 20 from inside the cable handling bow 2. In this exemplary embodiment, the supporting apparatus 26 comprises several spaced apart curved support surfaces 28 that are distributed along the gap 20. They may be attached to an angled beam 36 that extends parallelly to and along the first straight segment 14.

The cable handling bow 2 may be formed as a steel construction. In this exemplary embodiment, the cable retaining structure 4 is supported by a framework structure 30 having a plurality of interior frame members 32, a traverse 34 and the angled beam 36. The traverse 34 may extend parallel to a connection line between the first end 8 and the second end 10 and substantially spans over the whole width of the bow 2.

A lifting yoke 38 is pivotably connected to the framework structure 30. Exemplarily, it is located in a transition region between the first straight segment 14 and the second curved segment 16. It is attached to two upright frame members 32 of the framework structure by means of two spaced apart hinges. Exemplarily, the lifting yoke 38 is arranged on a substantially triangular sub frame to provide a high stability. The lifting yoke 38 allows to attach the cable handling bow 2 to a wire of a winch or a crane to be lifted and lowered from the overboarding system.

Figure 2:
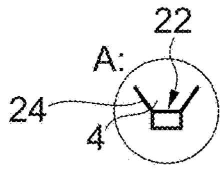
FIG. 2 shows a cable handling bow in a second perspective view.
Figure 2:
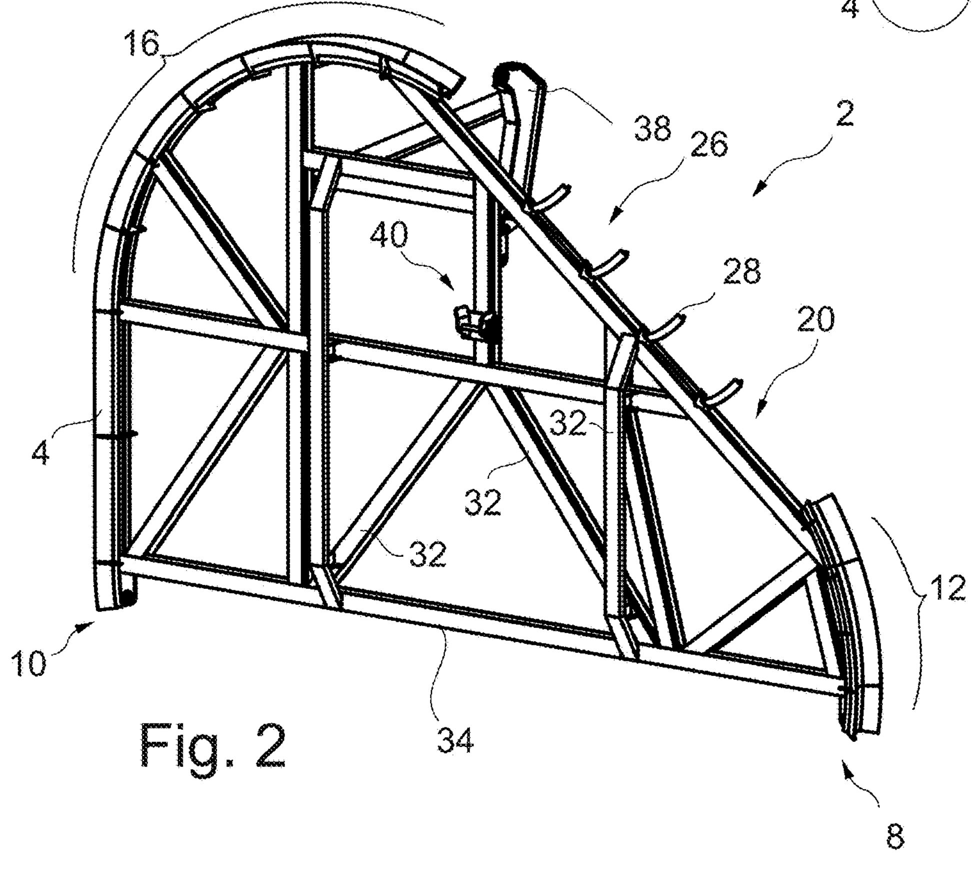

FIG. 2 shows the cable handling bow 2 from the side that is hidden in FIG. 1. In this illustration, a lug 40 arranged in a central region of the framework structure 30 is shown. The lug 40 is configured to receive a hook from a tilting device, on which the bow may be placed. The lug 40 is configured to receive the hook to temporarily secure the cable handling bow 2 to the tilting device, which will be explained further below.

Figure 3:
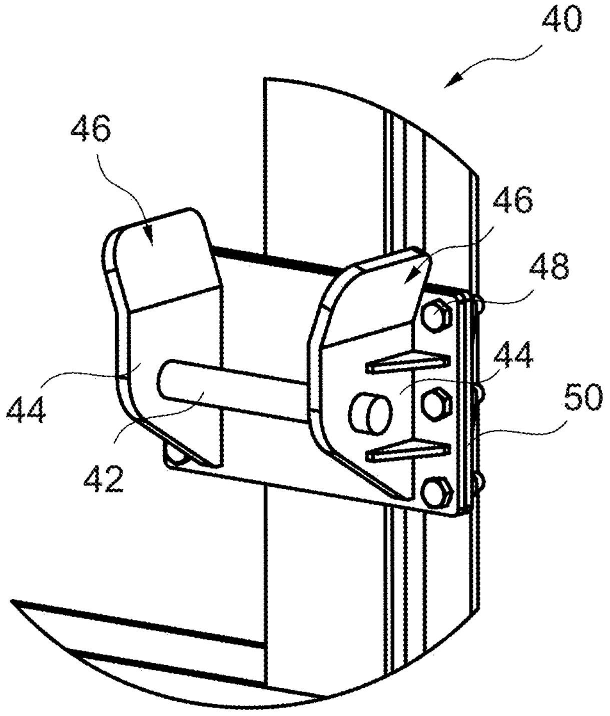
FIG. 3 shows a detail of a lug on the cable handling bow in a perspective view.

FIG. 3 shows the lug 40 in a detail view. The lug 40 comprises a transverse rod 42, which is parallel to the traverse 34, and which is held between two spaced apart flanges 44. The flanges 44 have an introduction section created by flange sections 46 extending in a direction away from the traverse. 34. A hook that is advanced to the transverse rod 42 will be guided by the flange sections 46 towards the transverse rod 42. Merely as an example, the lug 40 is attached to the framework structure 30 by bolts 48 and a counter plate 50.

Figure 4:
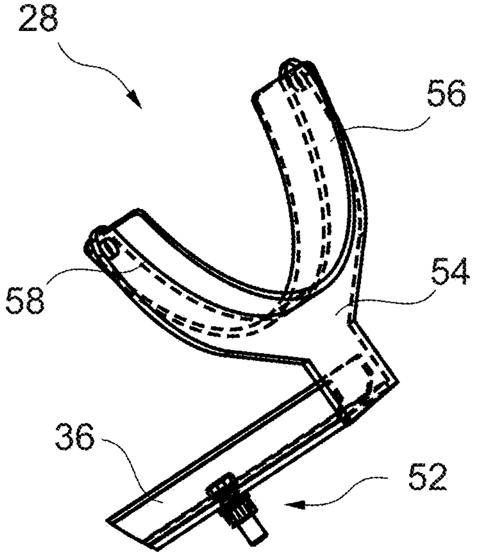
FIG. 4 shows a detail of the curved support surface in a perspective view.

FIG. 4 shows a support surface 28 in detail. The angled beam 36 may have an internal structure, to which the support surface 28 can be attached through a bolt connection 52. The support surface 28 may be arranged on a planar flange 54, e.g., by welding a bent sheet metal part 56 to a correspondingly shaped cutout 58 of the flange 54.

Figure 5:
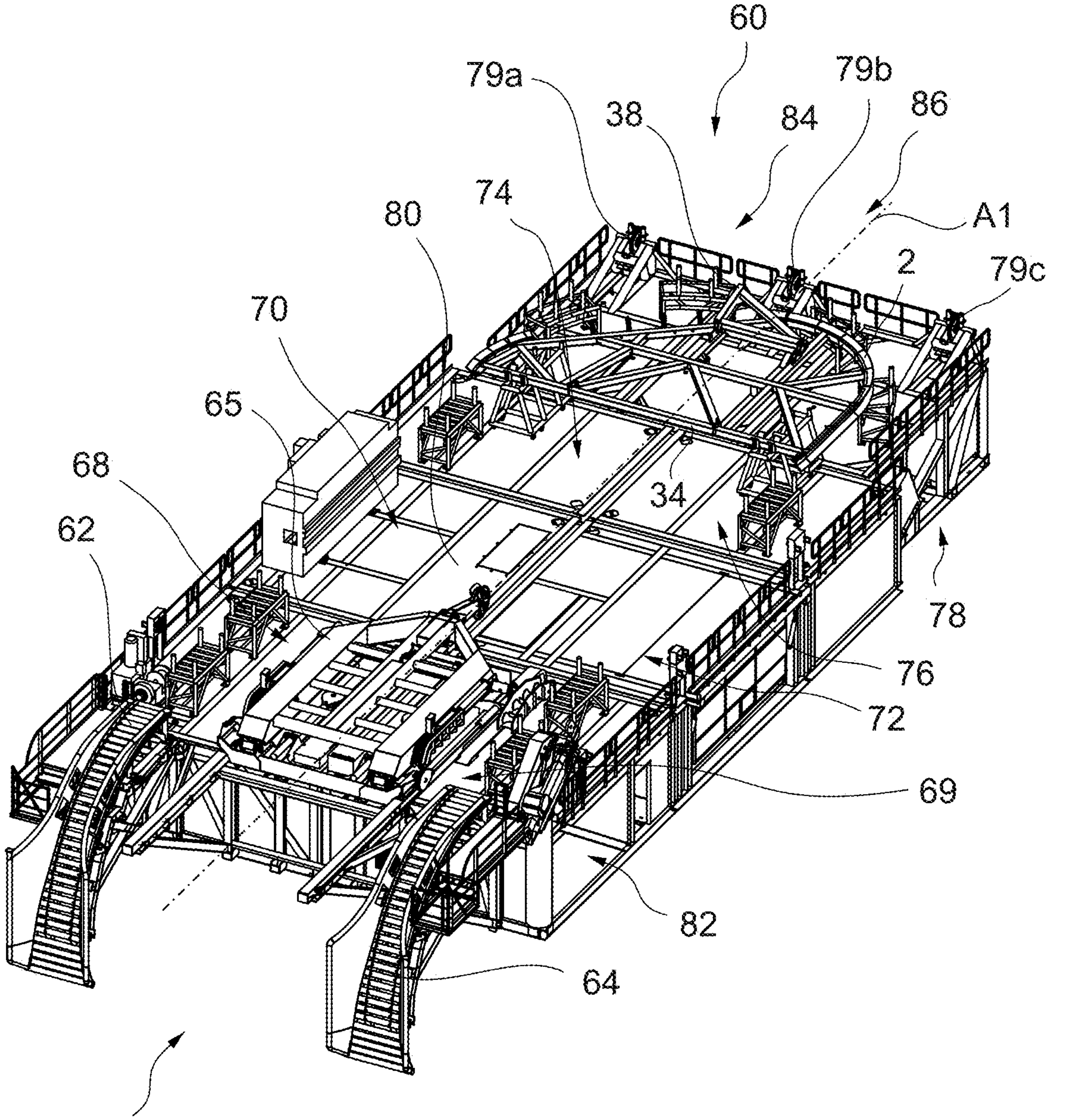
FIG. 5 shows a work platform in a perspective view.

FIG. 5 shows a work platform 60 in a perspective view from above. The work platform may be a part of or installed on a vessel or a boat. The work platform 60 comprises two spaced apart chutes 62 and 64 for guiding a cable from the sea and onto the work platform 60. Exemplarily, the chutes 62 and 64 may extend over an aft side 66 of the work platform 60. The chutes 62 and 64 are considered well known in the art, and will not be described in further detail.

The work platform 60 has a number of modules 68, 69, 70, 72, 74, 76, and 78, which can be placed adjacent to each other on a vessel deck. The modules together are configured to form a mezzanine deck 80 above the respective vessel deck and a protective lower deck 82 below the mezzanine deck 80. On the mezzanine deck 80, an overboarding system 84 is provided.

Each of the modules 68, 69, 70, 72, 74, and 76 may have a deck section and a support structure for supporting the deck section at a distance above the vessel deck. The modules 66, 68, 70, 72, 74, 76, and 78 may be configured to perform different tasks.

For example, the modules 68, 69 may be storage modules arranged at the aft side 66. Both modules 68 and 69 may be used for storing equipment for performing a cable operation. The module 70 may be a lift module a lift configured to lift equipment between an internal floor and the deck section. Module 72 may be a tensioner module having a tensioner lift and a cable tensioner, wherein the tensioner lift may be configured to lift the cable tensioner between a position above the deck section of the tensioner module 72 and a position below the deck section of the tensioner module 72. The modules 74 and 76 may comprise containers for storing equipment.

Module 78 may be a winch module that has a deck section, which may not cover the entire part of the winch module 78. Also, it may not comprise an internal floor. The winch module 78 may comprises a winch support for supporting winches in a position below the deck section of the winch module 78. For example, three winches **79*a*, 79*b*, 79*c* may be used, wherein one of the winches 79*a*, 79*b*, 79*c*, e.g. 79*b*, may be associated with the overboarding system 84, and wherein the two other winches 79*a* and 79*c*** may be used for lifting the ends of two cable sections.

The side opposed to the aft side 66 will be referred to as front side 86. A central longitudinal axis A1 of the work platform 60 is defined as a central axis between the aft side 66 and the front side 86 of the work platform 60.

In the illustration of FIG. 5, the cable handling bow 2 as a part of the overboarding system 84 is placed on the mezzanine deck 80 at the front side 86. It is arranged to be in a horizontal orientation. The cable handling bow 2 may be stored in this position to be ready for an overboarding process after conducting the desired cable operation. The overboarding process is shown in form of a sequence in FIGS. 6*a* to 6*i*.

Figure 6A:
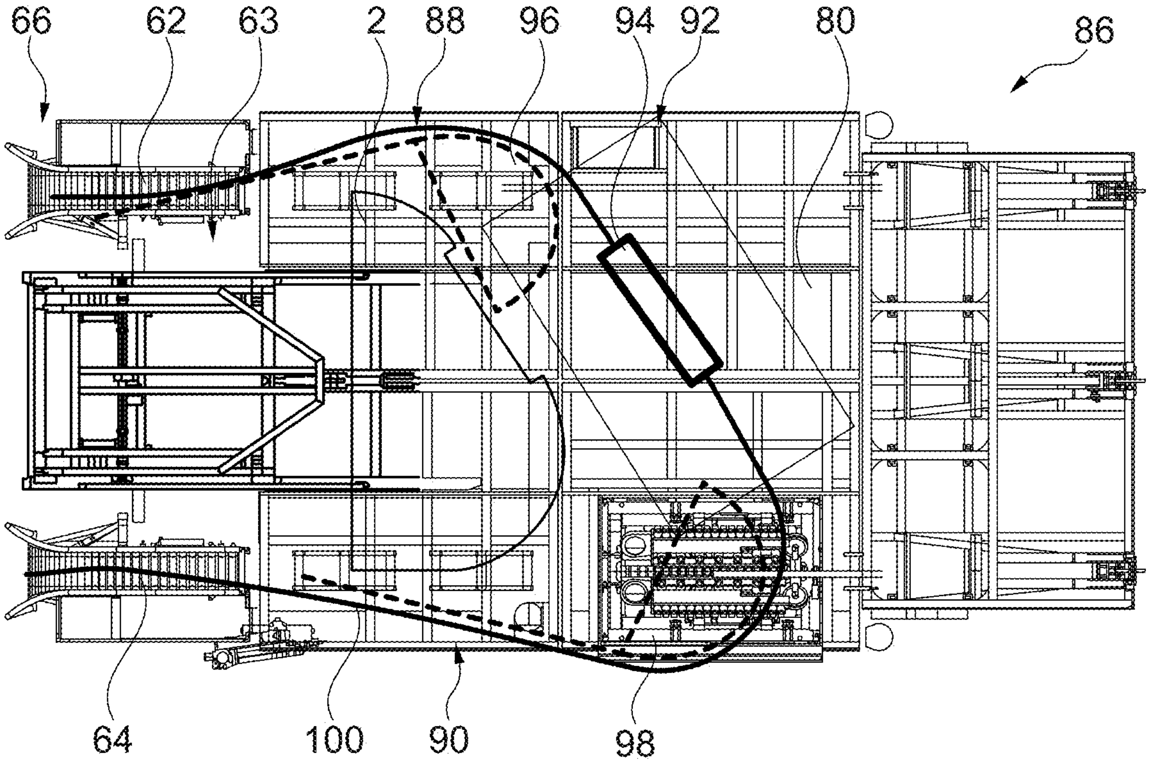

FIG. 6*a* shows the mezzanine deck 80 in a top view with a first cable section 88 that runs over the chute 62 and along a first cable guide 96 to a jointing area 92. A second cable section 90 runs over the chute 64 and along a second cable guide 98 to an opposed side of the jointing area 92. Both cable sections 88 and 90 are connected with a cable joint 94, which in this example is a stiff/rigid cable joint having an elongated shape. Thus, the cable sections 88, 90 and the cable joint 94 form a cable 100 with an integrated joint 94. On the jointing area 92, a tent may be erected to protect the jointing area 92 from water, dirt, wind, and other influences.

Figure 6B:
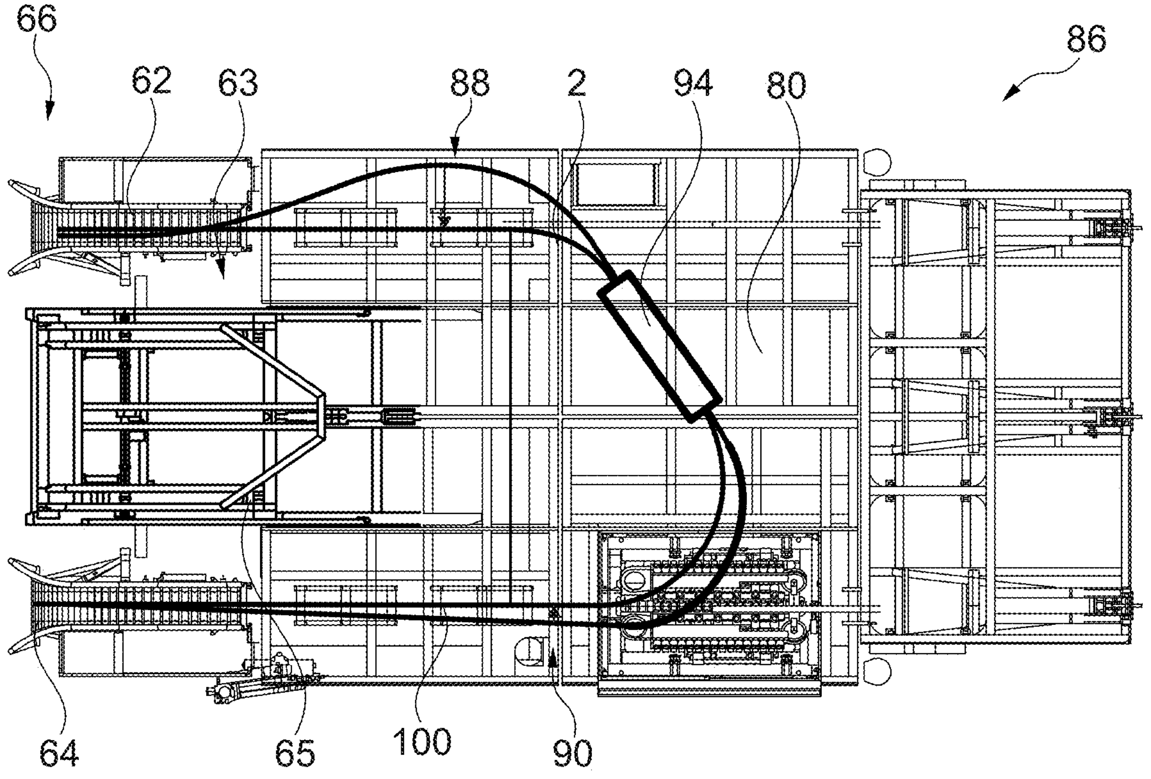

In this illustration, the cable handling bow 2 is placed further to the aft side 66, i.e. between the chutes 62 and 64 and the jointing area 92. After finishing the cable operation, the cable guides 96 and 98 are removed, and the cable handling bow 2 is moved towards the cable joint 94, i.e. further to the rear side 86. FIG. 6*b* shows the cable handling bow 2 being directly adjacent the cable 100 and the cable joint 94 being arranged in the first straight segment 14 of the cable handling bow 2.

During the cable operation, the radius of curvature of the cable sections 88 and 90 may be larger than the acceptable bending radius of the cable 100, to prevent an excessive bending due to unavoidable movements of the vessel with the cable sections 88 and 90 reaching into the open sea. As indicated by the arrows, the bending radii of curvature of the cable 100 at both sides of the cable handling bow 2 is reduced by tensioning the cable 100 after placing the cable handling bow 2.

Figure 6C:
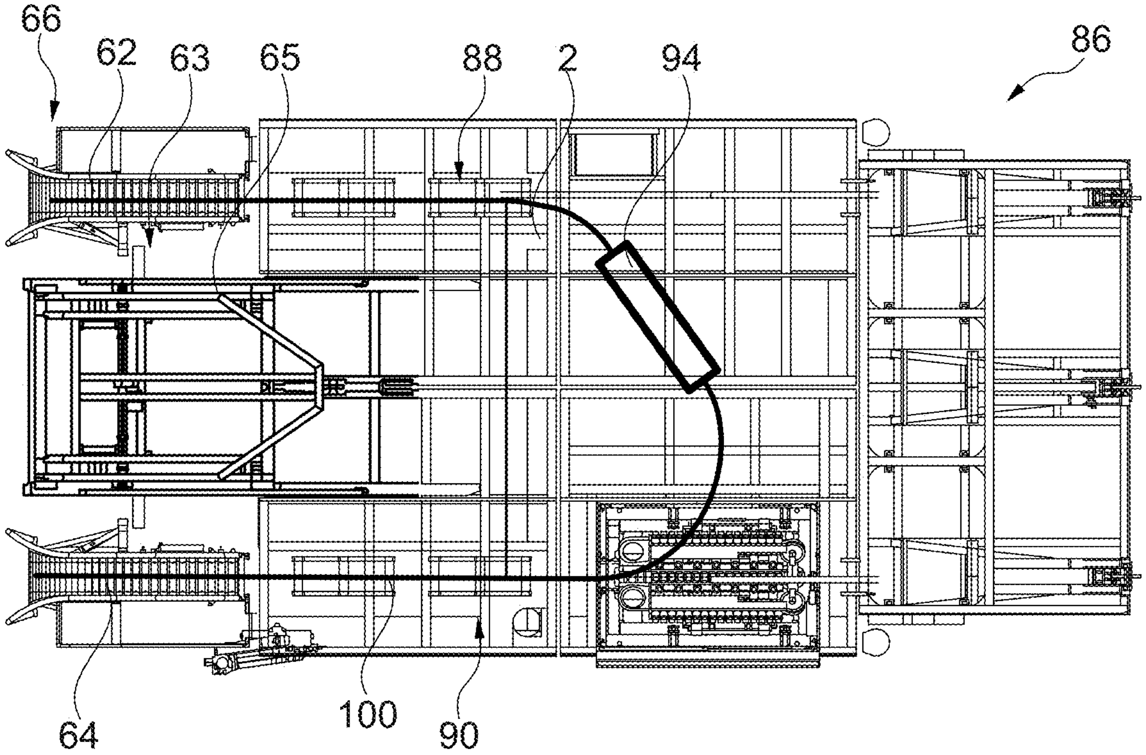

As shown in FIG. 6*c*, the shape of the cable 100 conforms the curvature of the cable retaining structure 4. Hence, the cable 100 with the cable joint 94 arranged in the gap 20 is turned about 180° at an acceptable bending radius over the cable handling bow 2 and the cable 100 runs straightly from the cable handling bow 2 over the chutes 62 and 64 into the open sea.

Figure 6D:
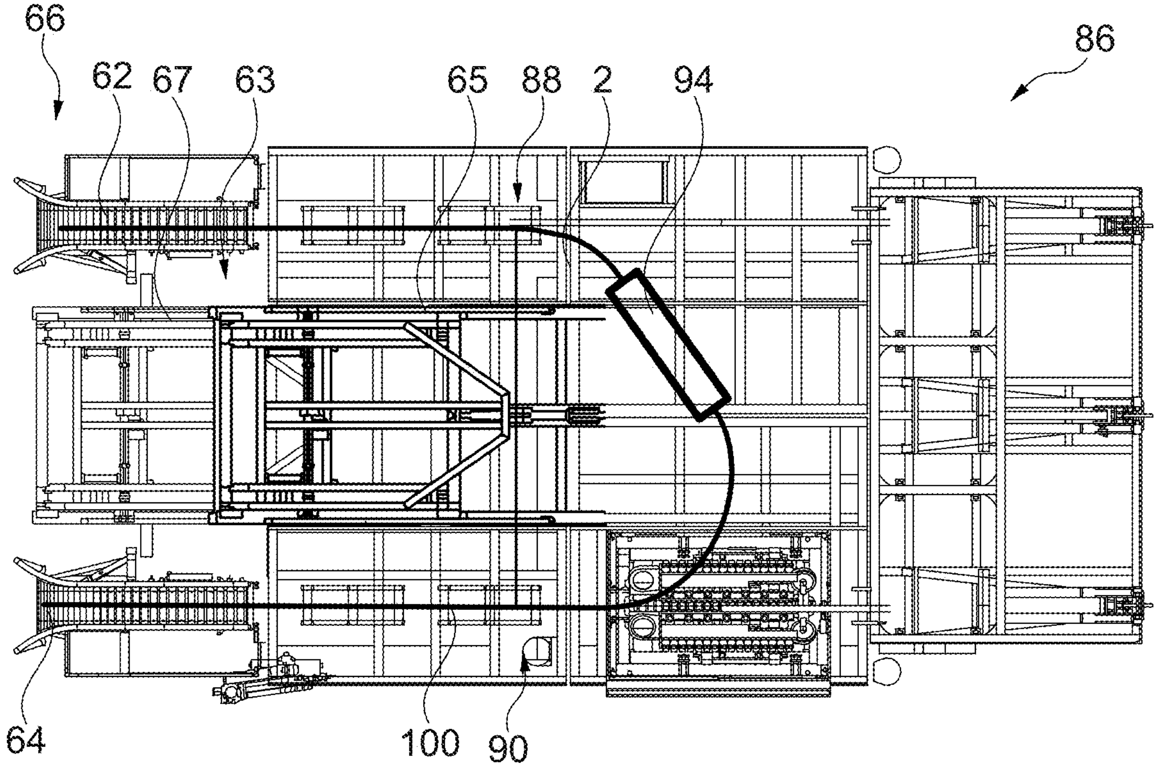

As a next step, as shown in FIG. 6*d*, a bow supporting frame 65 of a tilting device 63 is moved from a position between the chutes 62 and 64 towards the front side 86 until it reaches beneath the cable handling bow 2. In this position, the bow supporting frame 65 engages the cable handling bow 2 by moving a hook into the lug 40 (shown in reverse in FIG. 6*h*).

Figure 6E:
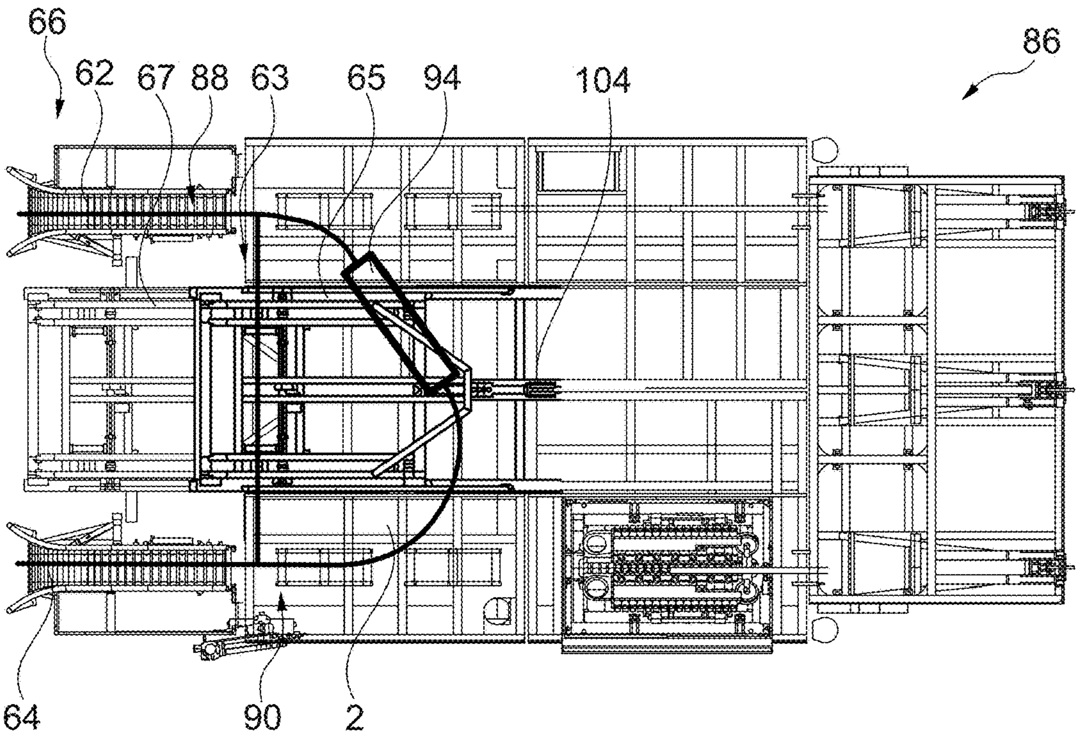

Then, the bow supporting frame 65 moves the cable handling bow 2 towards the aft side 66 and the chutes 62 and 64 onto a base frame 67, as shown in FIG. 6*e*. In doing so, the excessive lengths of the cable sections 88 and 90 are continuously submerged.

Figure 6F:
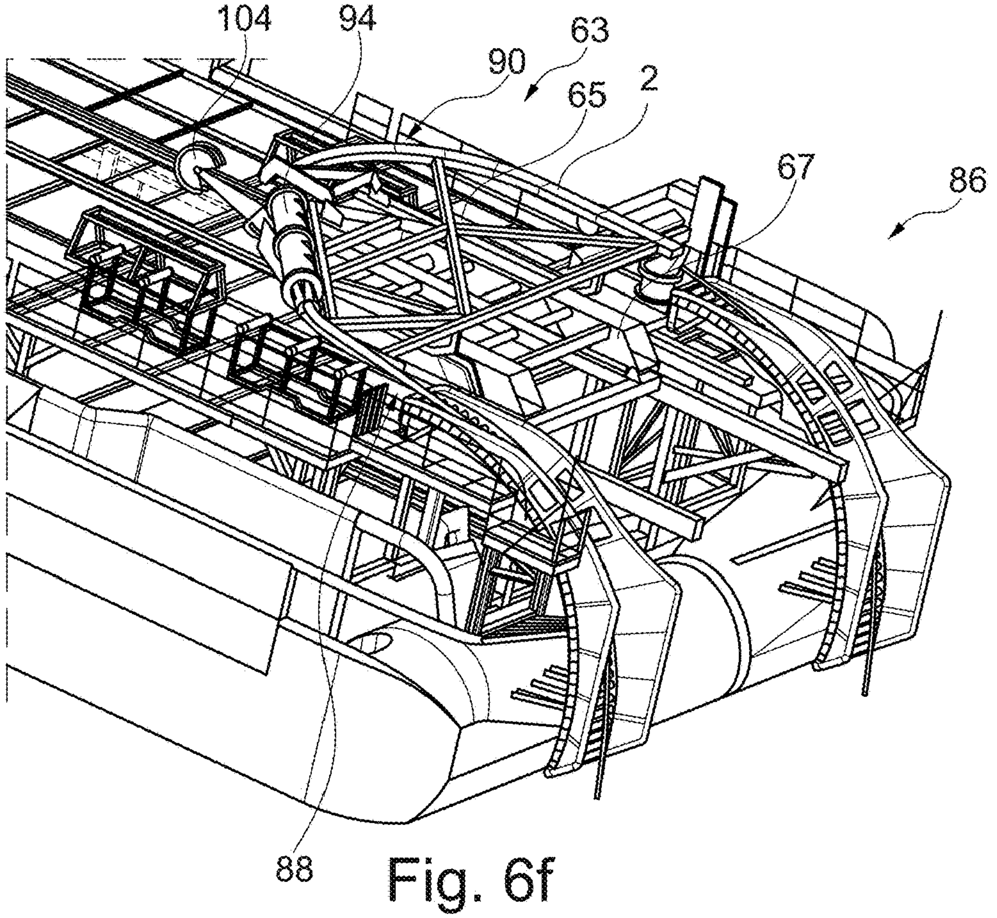

FIG. 6*f* shows a perspective view of the bow supporting frame 65 being arranged in the resulting horizontal position with the cable 100 on the cable handling bow 2 directly in front of the chutes 62 and 64.

Figure 6G:
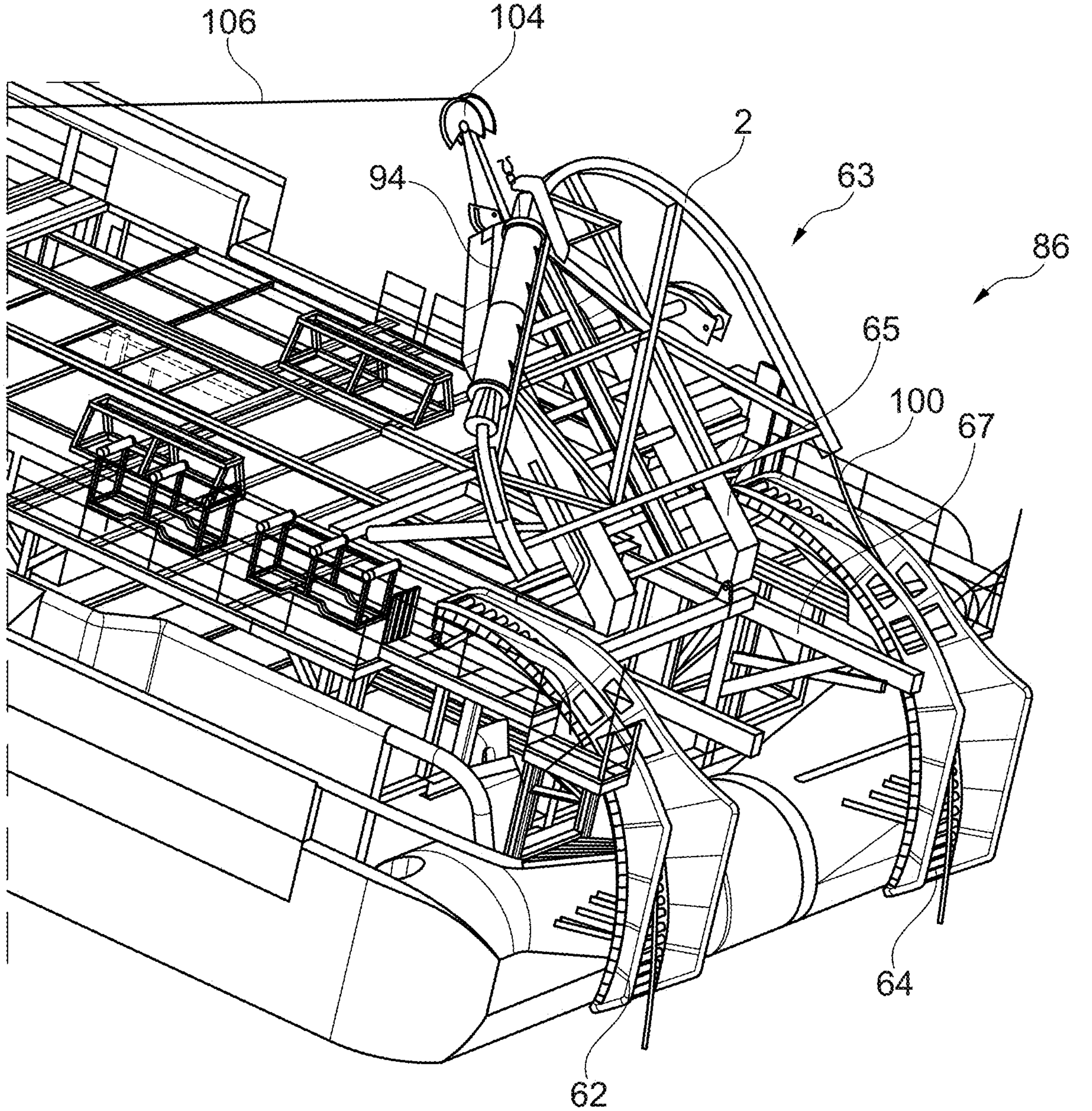
Figure 6H:
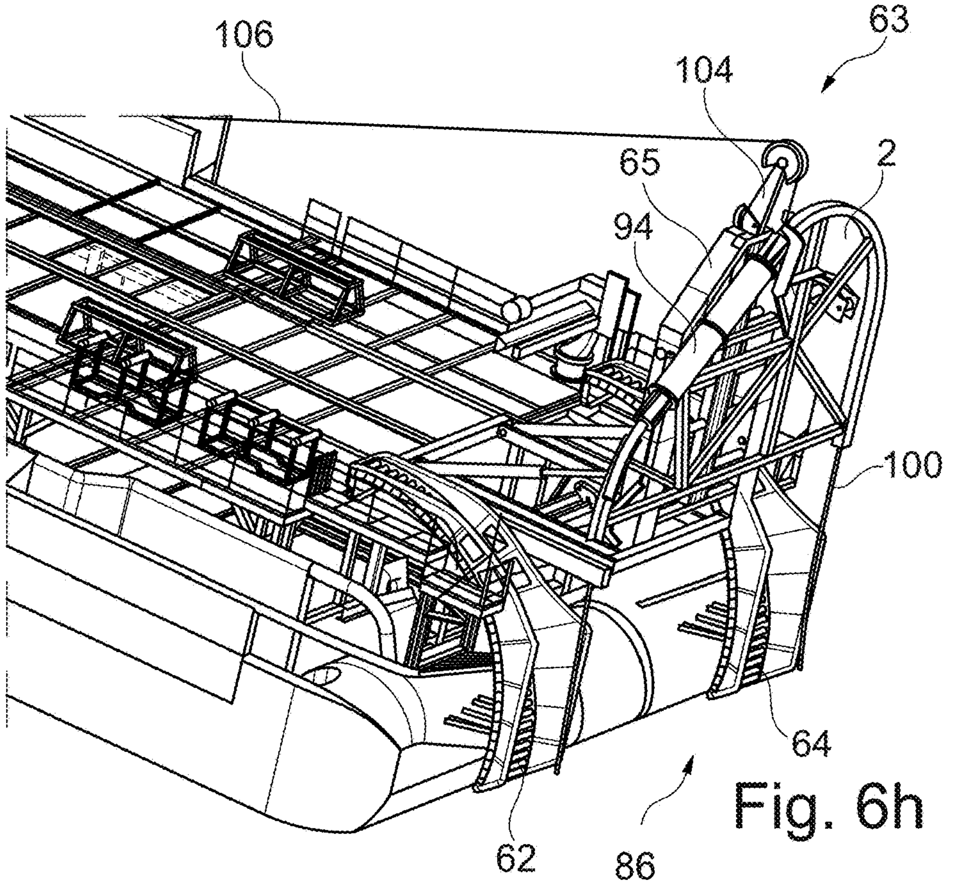
Figure 6I:
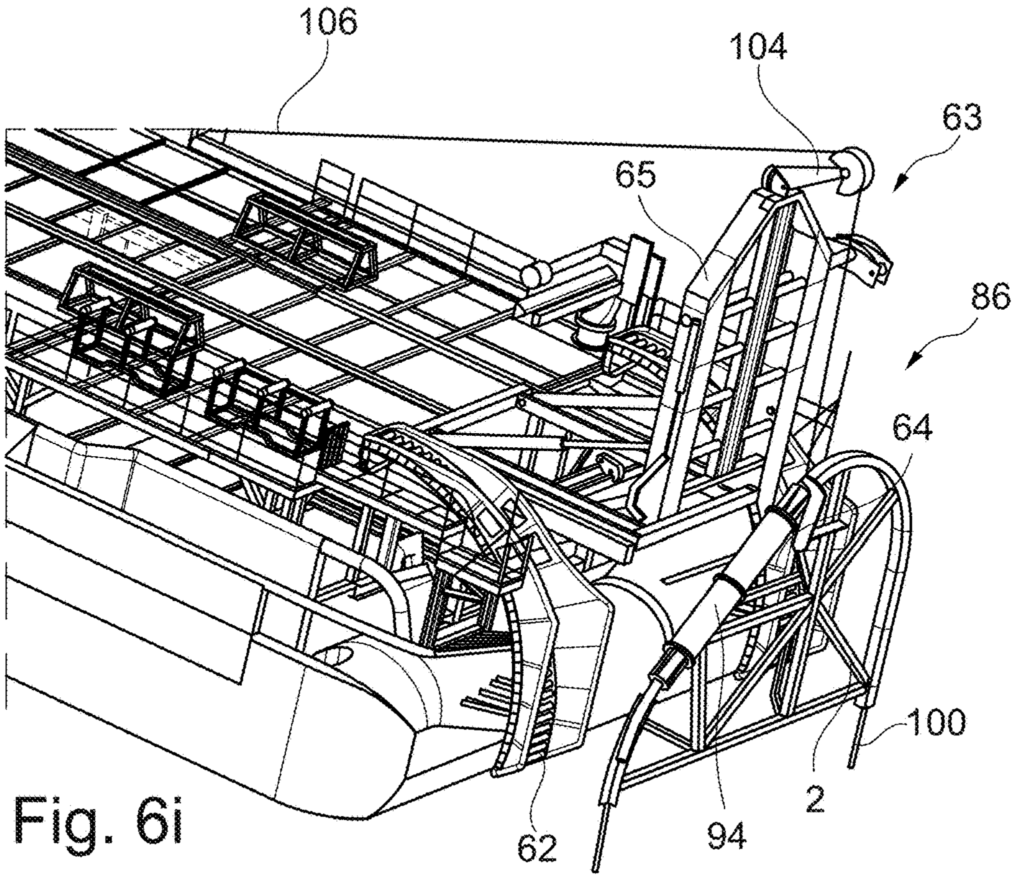

As shown in FIGS. 6*g* and 6*h*, the bow supporting frame 65 is tilted upwards into an upright position, until the bow supporting frame substantially perpendicularly extends from the mezzanine deck 80 upwards, which corresponds to the illustration of FIG. 6*h*.

At a top of the bow supporting frame 65, a sheave 104 is provided, which guides a winch wire 106 from the winch 79*b* to the yoke 38 of the cable handling bow 2. The winch 79*b* may be arranged in the winch module 78 further to the front side 86, as explained above. By pivoting the sheave 104 further to the aft side 66, the winch wire 106 will be guided into a greater distance to the bow supporting frame 65 and allows to space the cable handling bow 2 further apart from the bow supporting frame 65. Resultantly, the cable handling bow 2 is sufficiently spaced apart from the chutes 62 and 64 and can be lowered into the open sea to overboard the cable 100.

FIGS. 7*a* and 7*b* show a hook 102 swivably supported on the bow supporting frame 65. In FIG. 7*a*, the hook 102 engages the lug 40 of the cable handling bow 2 to secure the cable handling bow to the bow supporting frame 65. This may be done during moving the cable handling bow 2 towards the chutes 62 and 64 and tilting upwards. The hook 102 will be released from the lug 40 to release the cable handling bow 2 after reaching the position shown in FIG. 6*h*. Swiveling the hook to selectively engage or disengage the lug 40 may be achieved by a drive device, such as a hydraulic actuator.

REFERENCE NUMERALS

2 cable handling bow
4 cable retaining structure
6 path
8 first end
10 second end
12 first curved segment
13 first run length
14 first straight segment
16 second curved segment
17 second run length
18 second straight segment
20 gap
22 base surface
24 sidewall
26 supporting apparatus
28 support surface
30 framework structure
32 interior frame members
34 traverse
36 angled beam
38 lifting yoke
40 lug
42 transverse rod
44 flange
46 flange section
48 bolt
50 counter plate
52 bolt connection
54 flange
56 bent sheet metal part
58 cutout
60 work platform
62 chute
63 tilting device
64 chute
65 bow supporting frame
66 aft
67 base frame
68 module
69 module
70 module
72 module
74 module
76 module
78 module

79(*a-c*) winch
80 mezzanine deck
82 lower deck
84 overboarding system
86 front
88 first cable section
90 second cable section
92 jointing area
94 cable joint
96 first cable guide
98 second cable guide
100 cable
102 hook
104 sheave
106 winch wire
A1 central longitudinal axis

The invention claimed is:

1. A cable handling bow for an overboarding system of a work platform, the cable handing bow comprising: a cable retaining structure for retaining a length of a cable,
   wherein the cable retaining structure extends along a partially curved path, which path has a first end and an opposed second end,
   wherein the path has a first straight segment located between the first end and the second end and being spaced away from both ends, such that a cable joint connecting two ends of a cable is placeable in the first straight segment, when the cable length is retained in the cable retaining structure; and
   wherein the cable retaining structure has a gap that extends along the first straight segment, and wherein the gap is arranged asymmetrically on the cable handling bow.

2. The cable handling bow according to claim 1,
   wherein a first run length of the cable retaining structure from the first end to the first straight segment is smaller than a second run length of the cable retaining structure from the first straight segment to the second end.

3. The cable handling bow according to claim 2,
   wherein the second run length has at least double the size of the first run length.

4. The cable handling bow according to claim 1,
   wherein the path has a first curved segment arranged between the first end and the first straight segment, and a second curved segment arranged between the first straight segment and the second end.

5. The cable handling bow according to claim 1,
   wherein the path has a second straight segment arranged at the second end.

6. The cable handling bow according to claim 1,
   Further comprising a supporting apparatus reaching into the gap and configured to support a cable joint.

7. The cable handling bow according to claim 6,
   wherein the supporting apparatus comprises a plurality of curved support surfaces distributed along the gap.

8. The cable handling bow according to claim 1,
   further comprising a traverse extending from a region adjacent to the first end of the path to a region adjacent to the second end of the path,
   wherein the traverse and the first straight section enclose an angle in the range of 20° to 45°.

9. The cable handling bow according to claim 1,
   wherein the cable retaining structure comprises a trough.

10. A cable overboarding system for a work platform arrangeable on a vessel, comprising:
   a lowering device having a wire, and
   a cable handling bow according to claim 1 connected to the wire,
   wherein the wire is connected to the cable handling bow to lower the cable handling bow into the sea.

11. A work platform for performing a cable operation on a cable on a vessel having a vessel deck, wherein the work platform comprises:
   chutes for guiding the cable from the sea and onto the work platform, and
   an overboarding system according to claim 10,
   wherein the base frame and/or the bow supporting frame are at least partially arranged between the chutes.

12. The work platform according to claim 11,
   further comprising a number of modules,
   wherein at least some of the modules comprise a deck section and a support structure for supporting the deck section at a distance above the vessel deck,
   wherein each module is configured to be lifted separately onto and away from the vessel deck,
   wherein the deck sections of the modules together form a mezzanine deck on which the cable operation is performed,
   wherein the overboarding system is secured to the mezzanine deck, and
   wherein at least some of the equipment for performing the cable operation is stored below the mezzanine deck.

13. A method for overboarding a cable, comprising the steps of:
   providing a cable handling bow according to claim 1 on a deck in a substantially horizontal position,
   placing a cable length having a joint onto the cable handling bow, such that the joint is arranged in the first straight segment,
   tilting the cable handling bow into an upright position, and
   lifting and overboarding the cable handling bow from the deck.

* * * * *